June 28, 1927.
E. R. JOHNS
NUT ENCASEMENT
Filed July 26, 1926
1,633,639
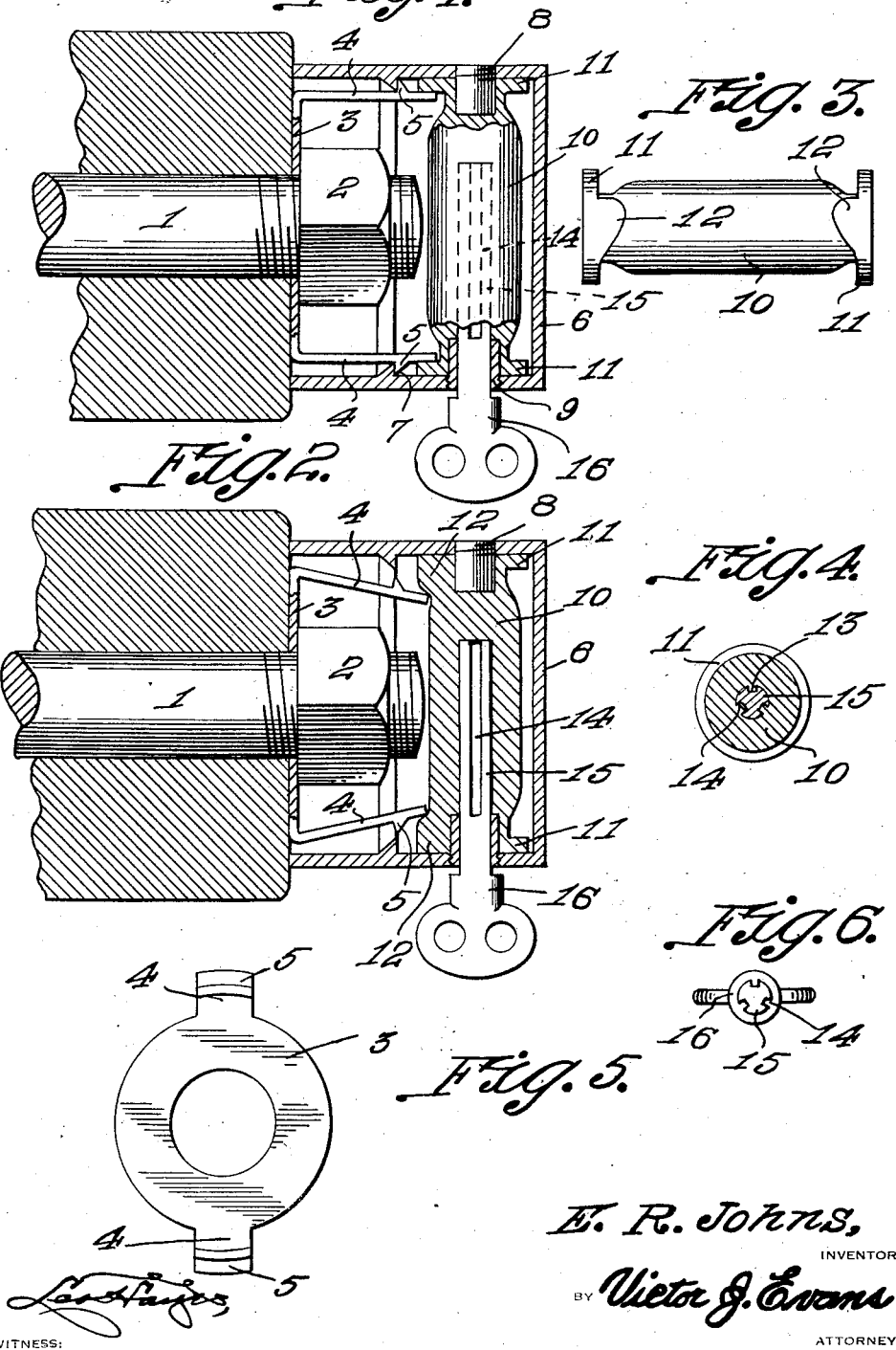
E. R. Johns,
INVENTOR
BY Victor J. Evans
ATTORNEY
WITNESS:

Patented June 28, 1927.

1,633,639

UNITED STATES PATENT OFFICE.

EMORY R. JOHNS, OF DALLAS, TEXAS.

NUT ENCASEMENT.

Application filed July 26, 1926. Serial No. 125,093.

Quite frequently a bolt engaged by a nut is employed for securing valuable devices upon a support, as for instance, the spare tire of an automobile. The nuts can be readily unscrewed from the bolts and the spare tire or like article can be thus detached from its support by unauthorized persons. It may, therefore, be considered the object of this invention to provide an extremely simple, cheap but thoroughly effective means for encasing such nuts so that access thereto cannot be obtained except by authorized persons.

A further object is the provision of a device for this purpose which includes an inner member that is arranged on the bolt and against which the nut is screwed, said member having spring arms provided with outstanding detents, and a casing having its sides notched to receive the detents of the arms therein, there being a revoluble barrel in the casing having cam surfaces for contacting with the spring arms of the first mentioned member, so that when the barrel is turned, through the medium of a suitable key, the arms will be swung toward each other so that the outer casing member can be removed from the inner casing member and the nut may be unscrewed from the bolt by the employment of the usual speed wrench.

To the attainment of the above broadly stated objects and others which will present themselves as the nature of the invention is better understood, the improvement resides in the novel features of construction, combination and operative association of parts, a satisfactory embodiment of which is disclosed by the accompanying drawings.

In the drawings:

Figure 1 is a view of my improvement in applied position, parts being in section.

Figure 2 is a view similar to Figure 1, but showing the barrel turned to bring its cams to engage with the spring arms of the inner casing member to permit of the separation of both casing members.

Figure 3 is a plan view of the barrel.

Figure 4 is a transverse section therethrough.

Figure 5 is a plan view of the inner casing member.

Figure 6 is an end view looking toward the bit end of the key.

In Figures 1 and 2 of the drawings, a bolt 1 passes through a support or through an element attached to a support. The element may be in the nature of a spare tire that is supported by the bolt on an automobile. The bolt 1 is engaged by a nut 2. However, before the nut is screwed on the bolt I arrange over the said bolt the disclike body member 3 of what I will term the inner casing element of the improvement. The member 3 is provided with diametrically opposite outstanding parallel spring arms 4, and each of said arms has on its outer face, adjacent to its end, an outstanding lug or detent 5. The outer casing section 6 of the improvement comprises a hollow member which has its sides thickened inwardly and provided with substantially V-shaped grooves 7 arranged to receive the substantially V-shaped lugs or detents 5 of the spring arms 4 therein. A single continuous groove 7 may be provided. Removably received through the sides of the casing section 6, outward of the groove 7, there are oppositely directed trunnions 8 and 9, respectively. The trunnion 8 may be in the nature of a solid member that has its outer end threaded but the trunnion 9 is in the nature of a tubular member. These trunnions are received in the socket end of a barrel 10. The barrel has its said ends formed with flanges 11 and inward of the flanges the barrel is reduced. Each flange is provided on its inner face with a cam enlargement 12. The barrel has a bore entering from the end thereof in which the trunnion 9 is received, and in this bore there are formed inwardly directed ribs 13. These ribs are designed to be received in grooves 14 in the bit portion 15 of a removable key 16. The key is operated to turn the barrel to bring the cams 12 out of the path of contact with the spring arms 4 of the member 3, so that the lugs or detents 5 will be received in the grooves 7 of the members 6 and both casing members will be thus locked together. Of course, the nut 2 is screwed on the bolt and contacts with the outer face of the casing member 3. Thus when the casing sections are locked together the nut is wholly concealed and the casing sections cannot be disassociated except by a person having the proper key. By again inserting the key in the barrel and turning the said barrel to bring the cams 12 into contacting engagement with the spring arms 4, the said arms will be swung at an inward angle, as disclosed by Figure 2 of the drawings, so that the lugs or detents 5 are brought out of the grooves 7. The outer casing section 6 may be then removed from the inner casing section, and the arms will spring to their initial position to permit of a speed or other wrench engaging the nut for separating the same from the bolt.

Having described the invention, I claim:—

The combination with a bolt which is screwed through a support or a device to be supported and which is engaged by a nut, of a disc-member arranged on the bolt and contacted by the nut, said disc member having peripheral outstanding spring arms provided with outwardly directed substantially V-shaped lugs, a casing section having an inner groove to receive the lugs of the spring arms therein, a barrel revoluble in the casing section, said barrel having flanged ends whose inner faces are formed with cam extensions, said barrel having a bore designed for coengagement with a removable key, all as and for the purpose set forth.

In testimony whereof I affix my signature.

EMORY R. JOHNS.